United States Patent
Chandler

(10) Patent No.: US 7,843,376 B1
(45) Date of Patent: Nov. 30, 2010

(54) CROSS-EYE JAMMING DETECTION AND MITIGATION

(75) Inventor: Cole A. Chandler, Gunter, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 307 days.

(21) Appl. No.: 11/955,529

(22) Filed: Dec. 13, 2007

Related U.S. Application Data

(60) Provisional application No. 60/882,077, filed on Dec. 27, 2006.

(51) Int. Cl.
*G01S 7/36* (2006.01)
*H04K 3/00* (2006.01)
(52) U.S. Cl. ............................. 342/17; 342/13; 342/16
(58) Field of Classification Search ............... 342/13–20
See application file for complete search history.

(56) References Cited

U.S. PATENT DOCUMENTS

| | | | | |
|---|---|---|---|---|
| 3,685,050 A * | 8/1972 | Cartwright | ...................... | 342/6 |
| 4,117,484 A * | 9/1978 | Shizume | ...................... | 342/15 |
| 4,328,496 A * | 5/1982 | White | ...................... | 342/15 |
| 4,454,513 A * | 6/1984 | Russell | ...................... | 342/174 |
| 4,882,587 A * | 11/1989 | Vodopia | ...................... | 342/372 |
| 5,371,506 A * | 12/1994 | Yu et al. | ...................... | 342/380 |
| 5,506,582 A * | 4/1996 | Lawsine | ...................... | 342/15 |
| 5,583,504 A * | 12/1996 | Huggett | ...................... | 342/15 |
| 5,600,326 A * | 2/1997 | Yu et al. | ...................... | 342/17 |
| 6,084,540 A * | 7/2000 | Yu | ...................... | 342/17 |
| 6,252,559 B1 * | 6/2001 | Donn | ...................... | 343/781 CA |
| 6,297,762 B1 * | 10/2001 | Labitt | ...................... | 342/14 |
| 6,317,072 B1 * | 11/2001 | Dollinger | ...................... | 342/16 |
| 6,492,937 B1 * | 12/2002 | Sparrow et al. | ............. | 342/125 |
| 6,567,034 B1 * | 5/2003 | Yu | ...................... | 342/16 |
| 6,614,381 B1 * | 9/2003 | Gross et al. | ................... | 342/14 |
| 6,633,251 B1 * | 10/2003 | Huggett | ...................... | 342/14 |
| 6,653,973 B2 * | 11/2003 | Yu | ...................... | 342/90 |
| 6,661,366 B2 * | 12/2003 | Yu | ...................... | 342/17 |
| 6,697,009 B2 * | 2/2004 | Yu | ...................... | 342/17 |
| 6,839,017 B1 * | 1/2005 | Dillman | ...................... | 342/16 |
| 6,867,726 B1 * | 3/2005 | Yu et al. | ...................... | 342/17 |
| 6,885,333 B2 * | 4/2005 | Sparrow et al. | ............... | 342/13 |

* cited by examiner

*Primary Examiner*—Thomas H Tarcza
*Assistant Examiner*—Peter M Bythrow
(74) *Attorney, Agent, or Firm*—Williams, Morgan & Amerson, P.C.

(57) ABSTRACT

The invention includes, in its various aspects and embodiments, a method and apparatus for detecting cross-eye jamming. In some embodiments, the invention includes mitigating cross-eye jamming once its presence is detected.

37 Claims, 6 Drawing Sheets

CROSS-EYE JAMMING DETECTION AND MITIGATION

The earlier effective filing date of co-pending U.S. Provisional Application Ser. No. 60/882,077, entitled "CROSS-EYE JAMMING DETECTION AND MITIGATION", filed Dec. 27, 2006, in the name of the inventor Cole A. Chandler, which is commonly assigned herewith, is hereby claimed. This application is also hereby incorporated by reference for all purposes as if set forth verbatim herein.

BACKGROUND OF THE INVENTION

1. Field of the Invention

The present invention is directed to RADAR applications, and, more particularly, to detection and mitigation of cross-eye jamming of RADAR signals.

2. Description of the Related Art

Radio detection and ranging ("RADAR") is a well-known remote sensing technology. RADAR was originally developed for military applications in which enemy units could be detected at ranges longer than could be achieved through direct, line of sight visual observation. Although RADAR still finds many military uses, it has made its way into a number of civilian contexts as well.

In very general terms, a typical, transmitted RADAR signal is what is known as a "sum signal". The sum signal is reflected from, for example, a target, and received by the RADAR. The RADAR receiver generates several signals from the return, one of which is known as a "sum signal," sometimes represented by the symbol "$\Sigma$" and another known as a "delta signal", "$\Delta$". The sum signal and delta signal can then be processed to determine the angles in azimuth and elevation from the RADAR to the target. In a classic case, a missile targeting an aircraft using RADAR, for example, can use these angles to guide the missile to the aircraft.

Sometimes, and particularly in military applications, it is desirable to interfere with the RADAR's use. In the classic case mentioned above, the aircraft would typically want to avoid being hit by the missile. The aircraft might employ a number of countermeasures. Some of these countermeasures may interfere with the operation of the RADAR.

One type of countermeasure is to "jam" the RADAR signal, and one well known kind of jamming is known as "cross-eye jamming." Cross-eye jamming affects monopulse antenna systems by causing errors in angle indication that are large enough to cause loss of track. In cross-eye jamming, the target intercepts the transmitted RADAR signal, manipulates it, and returns it to its source. The target manipulates the RADAR signal so that, when received and processed, the resultant sum signal looks like the delta signal should and the delta signal looks like the sum signal should. This, in turn, yields incorrect angle determinations.

More particularly, consider the missile/aircraft scenario again. When the missile is tracking the aircraft on boresight, the sum signal will show a maximum at the boresight and the delta signal will be zero. Cross-eye jamming, however, will cause the resultant sum signal to be zero on boresight and the delta signal to have a maximum on boresight. Thus, the missile will think the aircraft is no longer on boresight, erroneously turn off its flight path, and lose the aircraft.

A fuller explanation of cross-eye jamming is presented in U.S. Pat. No. 6,885,333, issued Apr. 26, 2005, to ITT Manufacturing Enterprises, Inc. as assignee of the inventors Mitchell J. Sparrow and Joseph Cikalo. This patent is hereby incorporated by reference for teaching the basic principles of cross-eye jamming as if set forth verbatim herein.

While cross-eye jamming brings a desirable result from the perspective of the target, the result is highly undesirable to the target's opponent. The target's opponent would therefore like to have a way to at least detect and, hopefully, to mitigate the effects of cross-eye jamming.

SUMMARY OF THE INVENTION

The invention includes, in its various aspects and embodiments, a method and apparatus for detecting cross-eye jamming. In some embodiments, the invention includes mitigating cross-eye jamming once its presence is detected.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention uses a receive beam steering technique to scan the sum beam. This technique finds the maximum response when the receive beam phase matches the incoming waveform phase. Because cross-eye essentially creates a difference pattern in the receive sum beam, the maximum likelihood search shows the difference pattern lobes of the cross-eye sources which can be used to estimate location. The presence of the two lobes and the divergence of the sum likelihood angle estimate compared to the monopulse estimate (two are equivalent on single sources) are prime indications of cross-eye.

Figure 1:
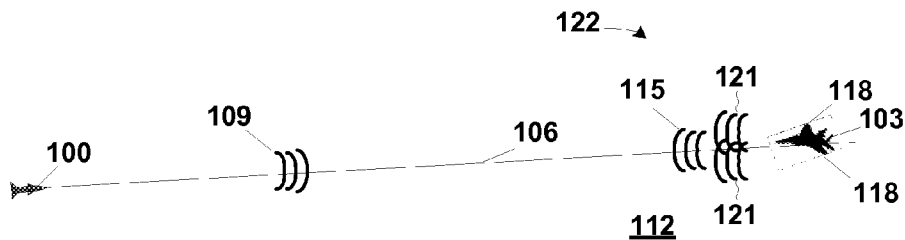
FIG. 1 illustrates a scenario in which the a platform is tracking a target using RADAR.

FIG. 1 depicts a platform 100 tracking a target 103 using RADAR. In the illustrated embodiment, the platform 100 is a missile. More particularly, the platform 100 is an air-to-air missile deployed from an aircraft (not shown). However, note that the invention admits wide variation in the implementation of both the platform 100 and the target 103. Either the platform 100 or the target 103 may be an aircraft, a ground unit, or a naval unit. Similarly, there is no need for either the platform 100 or the target 103 to be a weapon or a part of a weapon system. The invention may, in fact, be employed in purely civilian contexts should one arise.

Figure 2:
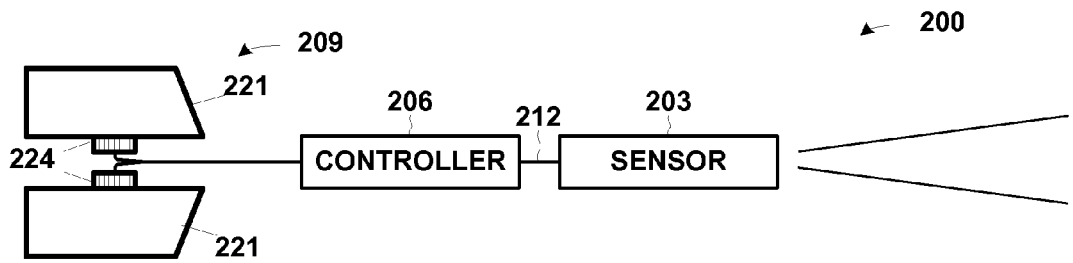
FIG. 2 depicts the detection of the target designation and control of the flight control mechanisms of the platform first shown in FIG. 1.

FIG. 2 conceptually depicts a selected portion 200 of the command and control ("2C") architecture of the platform 100 relative to the present invention and its operation. The portion 200 depicts a RADAR sensor 203, a controller 206, and a flight control mechanism 209. Note that, as will be appreciated by those skilled in the art having the benefits of this disclosure, the 2C architecture of the platform 100 is much more complex and involved than what is shown in FIG. 2. However, details unrelated to the present invention have been omitted for the sake of clarity and so as not to obscure the present invention.

The invention admits wide variation in the implementation of the RADAR sensor 203, depending on the remote sensing technology used. As previously noted, the RADAR sensor 203 is a monopulse RADAR. Note, however, that the present invention may be applied to other types of RADAR besides monopulse RADAR where cross-eye jamming may be encountered. For example, although cross-eye technique is most closely associated with the monopulse antenna topology, a four quadrant monopulse topology would allow the digital reconstruction of the sum likelihood surface in two dimensions (azimuth and elevation) such that it may be used with the present invention is some embodiments. The only limitation will be in the radar's hardware implementation to support the maximum likelihood receive beam computation/control which could be done a variety of ways depending on the system and its architecture. Having four quadrants or the equivalent sums and difference channels is the most straightforward, but the technique may be useful for lobe-on-receive only (LORO) systems as well.

The RADAR sensor 203 is "strapped down," i.e., it does not mechanically scan the RADAR signal 109, shown in FIG. 1, into the field of view 112. However, in alternative embodiments, the RADAR sensor 203 may include a mechanical scanner. The identification and selection of a suitable implementation for the RADAR sensor 203 for any given embodiment will readily be within the ordinary skill of those in the art having the benefit of this disclosure.

Figure 3:
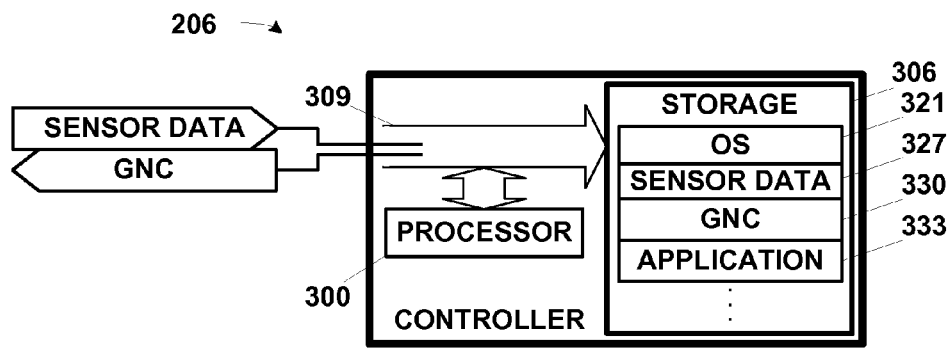
FIG. 3 depicts a controller first shown in FIG. 2 on board the platform of FIG. 1.

The controller 206 receives the output 212 of the RADAR sensor 203 and processes it in accordance with the present invention as will be discussed further below. In the illustrated embodiment, the controller 206 also outputs guidance navigation control ("GNC") commands to the flight control mechanism 209 of the platform 100 in accordance with its mission profile. FIG. 3 depicts selected portions of the controller 206, first shown in FIG. 2, in a block diagram. The controller 206 includes a processor 300 communicating with storage 305 over a bus system 309. Each of these components will now be discussed in turn.

The processor 300 may be any suitable processor known to the art. In general, the controller 206 will handle a fair amount of data, some of which may be relatively voluminous by nature and which is processed quickly. Thus, certain types of processors may be more desirable than others for implementing the processor 300. For instance, a digital signal processor ("DSP") may be more desirable for the illustrated embodiment than will be a general purpose microprocessor. In some embodiments, the processor 300 may be implemented as a processor set, such as a microprocessor with a mathematics co-processor.

The storage 305 may be implemented in conventional fashion and may include a variety of types of storage, such as a hard disk and/or random access memory ("RAM"). The storage 305 will typically involve both read-only and writable memory implemented in disk storage and/or cache. Parts of the storage 305 will typically be implemented in magnetic media (e.g., magnetic tape or magnetic disk) while other parts may be implemented in optical media (e.g., optical disk). The present invention admits wide latitude in implementation of the storage 305 in various embodiments.

The storage 305 is also encoded with a variety of software components, including an operating system 321, the sensor data 327, and a guidance navigation control ("GNC") application 330. That is, these software components "reside" on the storage 305. The processor 300 runs under the control of the operating system ("OS") 321, which may be practically any operating system known to the art. The controller 206 receives the sensor data 327 from the RADAR sensor 203 (shown in FIG. 2) and stores it on the storage 305. The sensor data 327 may be stored in any suitable type of data structure known to the art, such as first-in, first-out ("FIFO") queue. The GNC application 330 issues suitable GNC commands to the flight control mechanism 209 in accordance with the mission profile upon application of the method of the invention. The nature of the GNC commands will be dependent on the implementation of the flight control mechanism 209, which is further discussed immediately below.

Returning to FIG. 2, the flight control mechanism 209 is shown as comprising a plurality of flight control surfaces 221—i.e., fins—and their actuators 224. As will be appreciated by those in the art having the benefit of this disclosure, many types of flight control mechanisms may be employed. Many of these types, such as fins and canards, employ flight control surfaces. Others do not, however. For instance, some weapons might employ thrusters in addition to or in lieu of flight control surfaces. The invention is not limited by the nature of the flight control mechanism employed. Similarly, the number of components within the flight control mechanism 209 is not material. For instance, the platform 100 might employ three, four, or more flight control surfaces 221 or as many as 12 thrusters. Furthermore, the flight control mechanism 209 may be located aft (as shown), forward, or both aft and forward of the platform 100, depending in the implementation. Thus, the flight control surfaces 221 are, by way of example and illustration, but one means for controlling the flight of the platform 100 in accordance with the present invention.

More particularly and now referring now to both FIG. 2 and FIG. 3, the GNC application 330 issues 2C commands to the actuators 224. The flight control surfaces 221 rotate on pins (not shown) relative to the fuselage (also not shown) of the platform 100 to control the flight path of the platform 100 in pitch, yaw, and roll. Thus, in the illustrated embodiment, the 2C commands to the actuators are commands to rotate the flight control surfaces 221 and affect the desired changes in the flight path 124. However, the nature of the commands will vary with the implementation of the flight control mechanism 209. For instance, if the flight control mechanism 209 is implemented in thrusters, the commands might trigger the firing of the thrusters in a pattern and for a duration sufficient to effect the desired counter-maneuver. These and other implementation specific variations in this aspect of the invention will be readily apparent and implementable to those ordinarily skilled in the art having the benefit of this disclosure.

A software application 333 also resides on the storage 306. The software application 333 analyzes the sensor data 327 employing the method of the invention to detect evidence of cross-eye jamming. The software application 333 may constitute a constituent part of the GNC application 330 in some embodiments, or may constitute a stand alone software component interfaced with the GNC application 330.

As is apparent from the discussion above, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Furthermore, the method of the invention is not limited to implementation in software. Alternative embodiments may implement the method in hardware or some combination of hardware and software. A hardware implementation might, for instance, split each quadrant's signal into a number of predefined angle taps where a series of fixed gain and phase values would be applied to simultaneously steer the receive beam to the desired angles. The number of splits would determine the number of fixed preset scan angles used to cover the angles of interest. Then the results of the angle tap maxima would be compared to the results of the monopulse angle using appropriate scale factors and if cross-eye was indicated the likelihood estimate would be used instead of the monopulse estimate. In a mixed software and hardware implementation, the radar would send out a pulse burst that would be modified by the cross-eye jammer and returned to the victim radar. The digital technique would store the pulse burst and apply a set of steering weights to electronically steer the sum channel beam within the angle of interests and thereby build the likelihood surface. Then a likelihood surface algorithm would compare those results to the monopulse computation and if the divergence exceeds a predefined threshold (e.g., the beamwidth) the sum likelihood angle estimate would be used to replace the monopulse estimate.

Returning to FIG. 1, the platform 100 is tracking the target 103 on boresight on a flight path 106. The platform 100 is employing a monopulse RADAR (not separately shown) that pulses a RADAR signal 109 into the field of view 112 for the platform 100. The platform 100 generates and transmits the RADAR signal 109 in conventional fashion and any suitable RADAR transmitter may be employed for that purpose. The RADAR signal 109 is reflected from the target 103 back to the platform 100.

Figure 4:
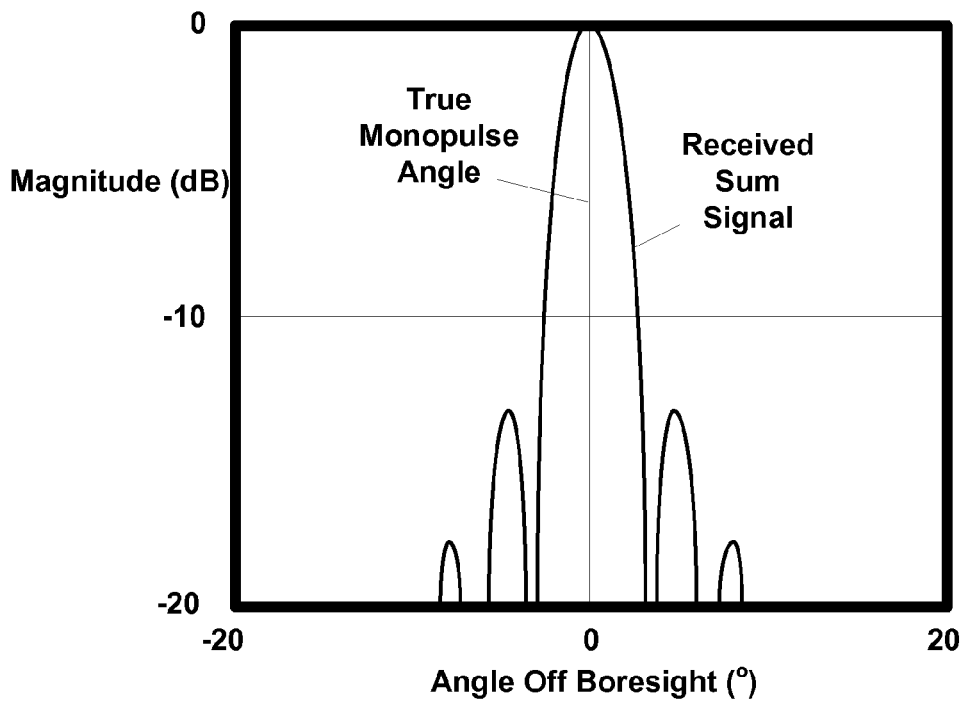
FIG. 4 graphs the received sum signal magnitude as a function of angle off boresight in the absence of cross-eye jamming.

The platform 100 receives the reflected signal 115 and processes it in accordance with conventional practice to determine the "monopulse angle" to the target 103. FIG. 4 graphs the received sum signal magnitude as a function of angle off boresight in the absence of cross-eye jamming. Note that the maximum of the signal is on boresight (i.e., 0° off boresight). So, since the platform 100 is tracking on boresight, the delta signal is zero, the sum signal is at its maximum and:

$$\text{Monopulse Angle} = \frac{\Delta}{\Sigma}$$

Thus, the monopulse angle signal, if also graphed, would match that of the received sum signal. So, since the platform 100 is tracking on boresight, the delta signal is zero.

Referring again to FIG. 1, the platform 100 continues tracking the target 103 over time, periodically pulsing the RADAR signal 109 and maintaining the flight path 106 from the reflected signal 109. At some point, the target 103 detects the RADAR signal 109 and the tracking, and initiates cross-eye jamming countermeasures. In the illustrated embodiment, the target 103 is equipped with cross-eye jamming pods (not shown) on its wingtips 118. The target 103 then generates and transmits cross-eye jamming signals 121 from those pods in accordance with conventional practice that produces a wavefront distortion at the platform 100. Thus, at this point, the reflected signals 122 seen by the platform 100 include the "true" reflections 115 and the cross-eye jamming signals 121.

Figure 5:
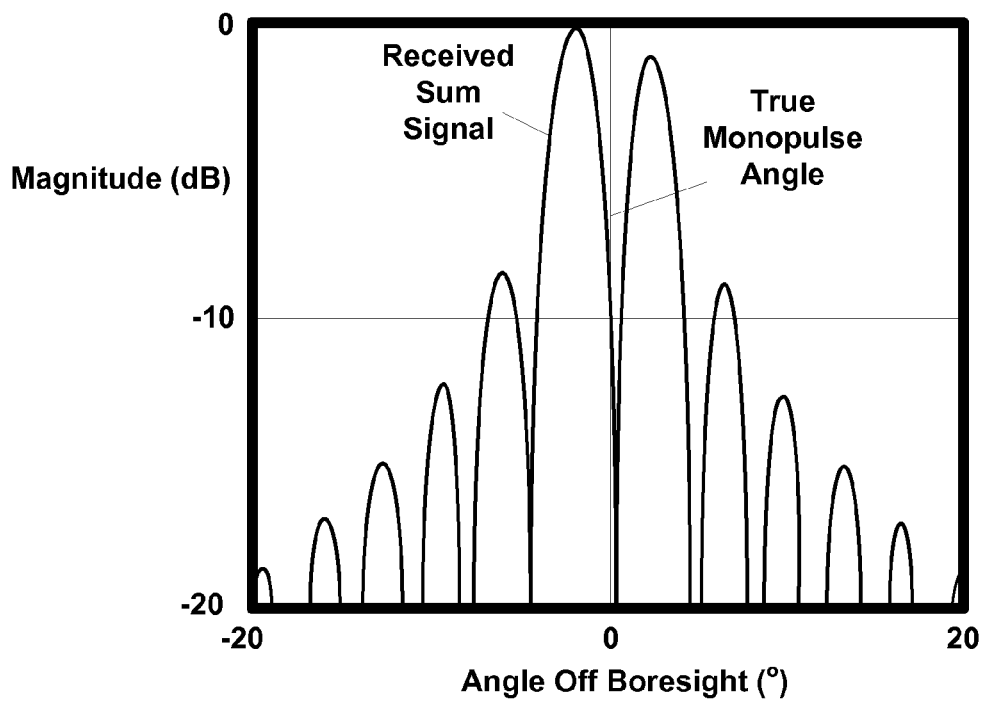
FIG. 5 graphs the received sum signal magnitude as a function of angle off boresight in the presence of cross-eye jamming.

FIG. 5 graphs the received sum signal magnitude as a function of angle off boresight in the presence of cross-eye jamming. It also graphs the true monopulse angle from the platform 100 to the target 103. Note the disparity between the maxima of the true monopulse angle and the received sum signal. Note also that the sum signal is zero, or what the delta signal would be in the absence of cross-eye jamming. The delta signal will also be at the maximum, or what the sum signal would be in the absence of the cross-eye jamming. Thus, whereas at true boresight tracking the delta signal is zero and the sum signal is at a maximum, the cross-eye jamming will make the delta signal look like the sum signal and the sum signal look like the delta signal. The determination of the monopulse angle from the delta and sum signals will therefore yield an indeterminate result since the sum signal is essentially zero.

Figure 8A:
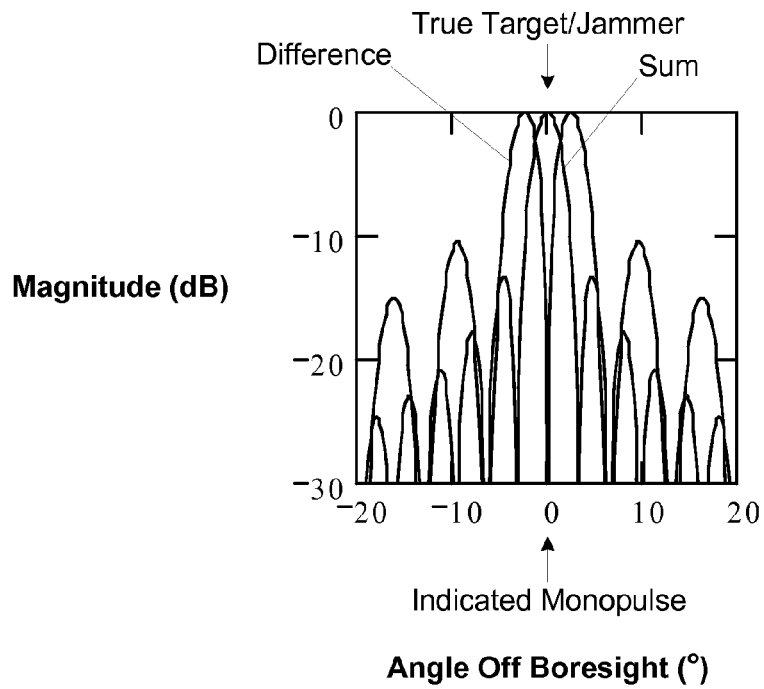
FIG. 8A-FIG. 8C graphically illustrate the effect of cross-eye jamming and the maximum likelihood result arrived at from the jammed sum and difference signals using the method of the present invention.
Figure 8B:
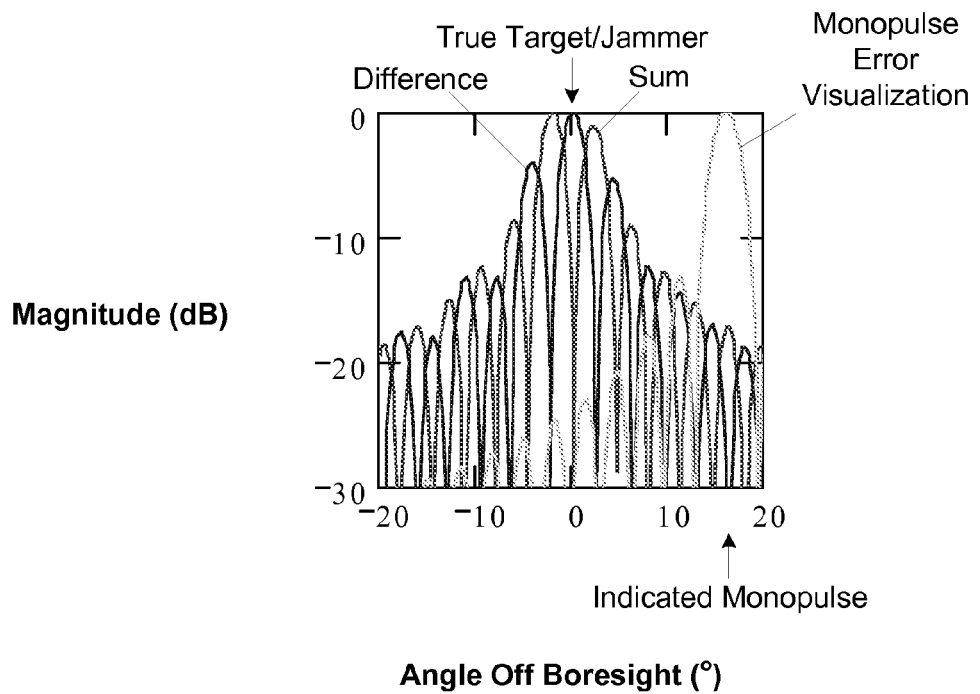
Figure 8C:
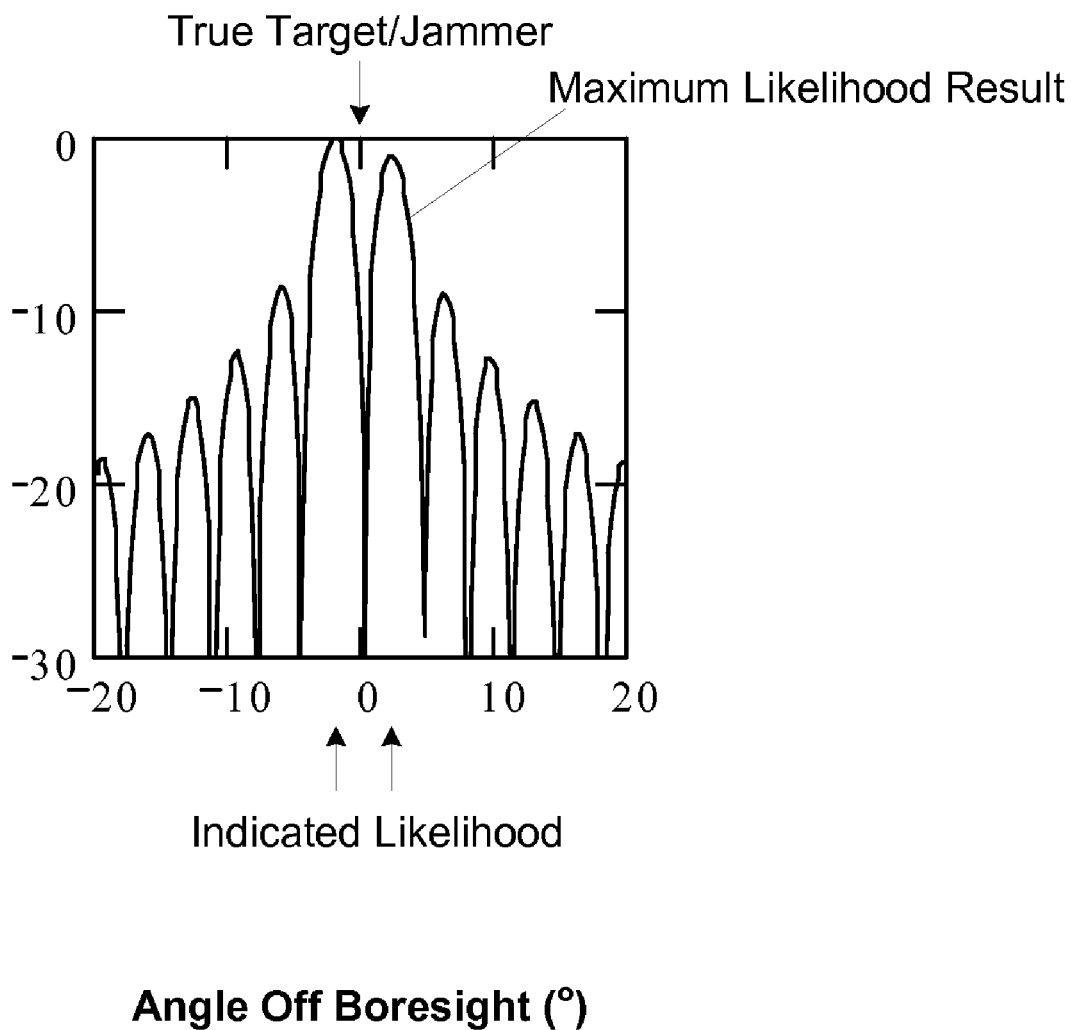

More particularly, consider FIG. 8A-FIG. 8C. FIG. 8A graphs the sum and difference signals for a target on boresight and the signals indicate a target location (i.e., "indicated monopulse") on boresight. FIG. 8B illustrates the effect of cross-eye jamming, and graphs the sum and difference signals for the target still on boresight. FIG. 8B also graphs the monopulse error visualization resulting from the cross-eye jamming that indicates the target off-boresight. FIG. 8C then graphs the maximum likelihood result arrived at from the sum and difference signals graphed in FIG. 8B using the method of the present invention. FIG. 8A-FIG. 8C are all graphs of magnitude as a function of angle off boresight.

Figure 6:
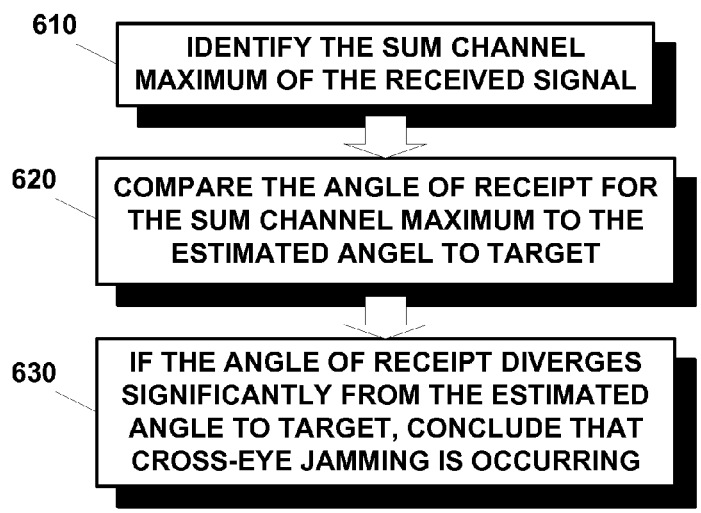
FIG. 6 illustrates one particular embodiment of such a method for determining whether a received reflected sum RADAR signal evidences the effects of cross-eye jamming.
Figure 7A:
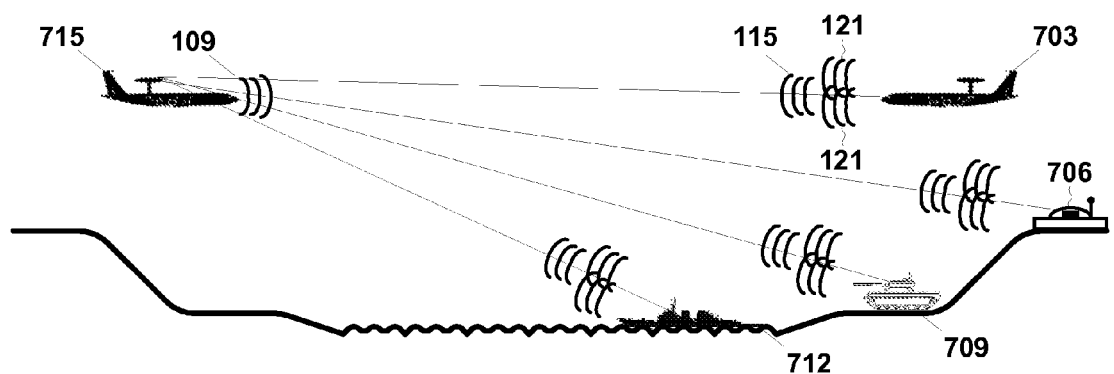
FIG. 7A-FIG. 7D illustrate some alternative embodiments to illustrate the scope of the variation in application of the invention in terms of platforms and target.
Figure 7B:
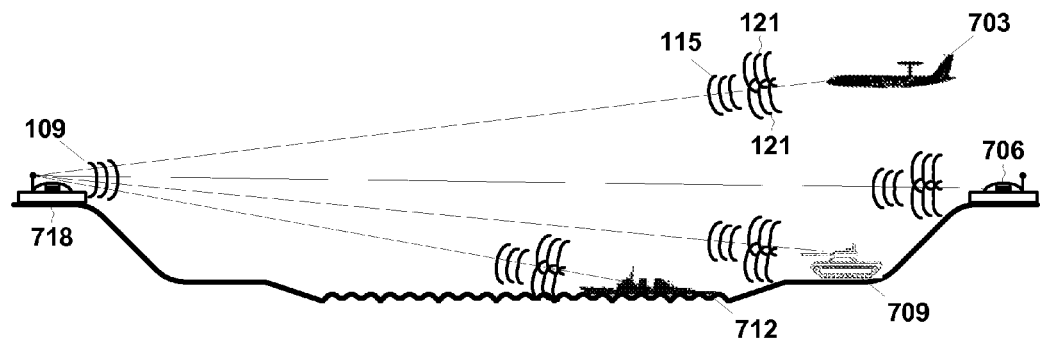
Figure 7C:
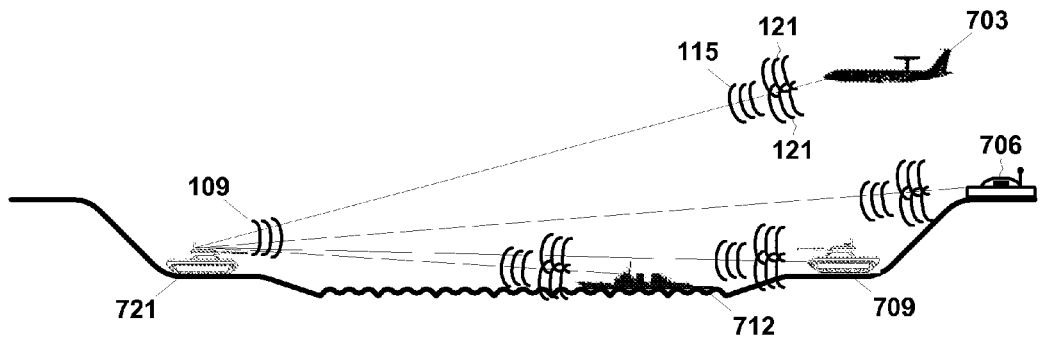
Figure 7D:
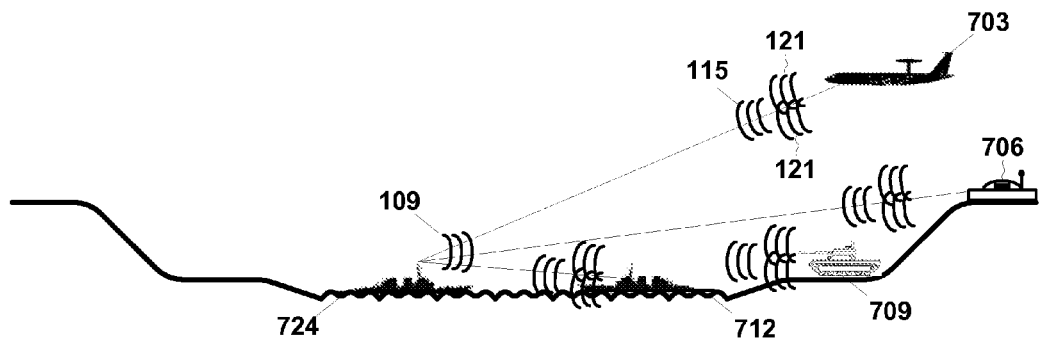

However, the platform 100 is employing the method of the present invention to detect cross-eye jamming. In general, the platform 100 employs a determining whether a received reflected sum RADAR signal evidences the effects of cross-eye jamming. FIG. 6 illustrates one particular embodiment of such a method. The method 600 illustrated in FIG. 6 begins by identifying (at 610) the sum channel maximum of the received signal. Next, the method 600 compares the angle of receipt for the sum channel maximum to the estimated angle to target. The angle estimate could use a variety of techniques know to the art for estimating actual target position, such as weighted centroid, estimate jamming source locations given measured likelihood angles, frequency and range, etc. And, if the angle of receipt diverges significantly from the estimated angle to target, the method concludes (at 630) that cross-eye jamming is occurring. A "significant divergence" may be considered to be, for example, a difference greater than the sum channel beamwidth. Note that this amount may vary from embodiment to embodiment depending upon system performance.

Once, the cross-eye jamming is detected—e.g., using the method 600 of FIG. 6—the present invention can be used, in some embodiments, to mitigate the effect of the cross-eye jamming. For instance, one could replace monopulse angle estimate with maximum likelihood angle estimate. Or, one can estimate the physical location of where the cross-eye jamming signals originate. The physical location of the cross-eye jamming signal origination can then be used to track the target.

As discussed above, the origins will typically be located on the target 103, and therefore provide a position for at least that part of the target 103. The platform 100 can then determine tracking angles to one or both of the physical locations and thereby maintain track. As was also discussed above, at least for aircraft, these physical locations will usually be mounted on wingtips, or equidistant from the fuselage of the aircraft. The platform 100 can therefore target a midpoint on a line between the two physical locations on the assumption this is true. The present invention therefore can not only detect the presence of cross-eye jamming, but can also be used to overcome, or at least mitigate, its pernicious affects.

As previously mentioned, the invention admits wide variation in the implementation of the platform 100 and the target 103. FIG. 7A-FIG. 7D illustrate some alternative embodiments to illustrate the scope of such variation. For example, in each of FIG. 7A-FIG. 7D the target 103 is shown implemented as a surveillance aircraft 703, a ground-based facility 706, a ground unit 709, and a naval unit 712. The target 100 is shown in implemented as a surveillance aircraft 715, a ground-based facility 718, a ground unit 721, and a naval unit 724 in FIG. 7A-FIG. 7D, respectively. Note that, although not shown, the platform 100 and the target 103 might alternatively be implemented in a space vehicle, such as a satellite, in some embodiments.

Thus, the present invention presents a simple, robust technique to both detect and mitigate the effects of cross-eye jamming. A divergence between a radar/seeker sum channel maximum likelihood search technique and monopulse angle estimation is used to indicate the presence of cross-eye jamming. Additionally, the sum channel maximum likelihood can be used to determine the physical location of the cross-eye jamming sources. The maximum likelihood can be computed from four quadrant monopulse antenna topology on receive only or by physically scanning the sum antenna beam on receive.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising determining whether a received reflected sum RADAR signal evidences the effects of cross-eye jamming, wherein the method is performed in software executed by a processor, or in hardware, or in a combination of hardware and software executed by a processor.

2. The method of claim 1, wherein determining whether the receive signal evidences the effects of cross-eye jamming includes:
    identifying the sum channel maximum of the received signal;
    comparing the angle of receipt for the sum channel maximum to the estimated angel to target; and
    if the angle of receipt diverges significantly from the estimated angle to target, concluding that cross-eye jamming is occurring.

3. The method of claim 1, wherein identifying the sum channel maximum includes scanning the received signal.

4. The method of claim 3, wherein scanning the received signal includes electronically scanning the received signal.

5. The method of claim 3, wherein scanning the received signal includes physically scanning the received signal.

6. The method of claim 1, further comprising receiving the reflected sum RADAR signal.

7. The method of claim 1, further comprising applying cross-eye jamming countermeasures upon detecting evidence of cross-eye jamming in the reflected signal.

8. The method of claim 7, wherein applying cross-eye jamming countermeasures includes estimating the source of the cross-eye jamming.

9. A cross-eye jamming detector, comprising:
    a computing device;
    a bus system;
    a storage communicating with the computing device over the bus;
    a software application residing on the storage and, when executed by the computing device, determines whether a received reflected sum RADAR signal evidences the effects of cross-eye jamming.

10. The cross-eye jamming detector of claim 9, wherein determining whether the receive signal evidences the effects of cross-eye jamming includes:
   identifying the sum channel maximum of the received signal;
   comparing the angle of receipt for the sum channel maximum to the estimated angel to target; and
   if the angle of receipt diverges significantly from the estimated angle to target, concluding that cross-eye jamming is occurring.

11. The cross-eye jamming detector of claim 9, wherein identifying the sum channel maximum includes scanning the received signal.

12. The cross-eye jamming detector of claim 11, wherein scanning the received signal includes electronically scanning the received signal.

13. The cross-eye jamming detector of claim 11, wherein scanning the received signal includes physically scanning the received signal.

14. The cross-eye jamming detector of claim 9, further comprising receiving the reflected sum RADAR signal.

15. The cross-eye jamming detector of claim 9, further comprising applying cross-eye jamming countermeasures upon detecting evidence of cross-eye jamming in the reflected signal.

16. The cross-eye jamming detector of claim 15, wherein applying cross-eye jamming countermeasures includes estimating the source of the cross-eye jamming.

17. A vehicle, comprising:
   a antenna capable of receiving a reflected sum RADAR signal;
   a cross-eye jamming apparatus that, in operation, scans the received signal for evidence of cross-eye jamming and, if detected, mitigates cross-eye jamming; and
   a guidance controller capable of guiding the vehicle.

18. The vehicle of claim 17, wherein determining whether the receive signal evidences the effects of cross-eye jamming includes:
   identifying the sum channel maximum of the received signal;
   comparing the angle of receipt for the sum channel maximum to the estimated angel to target; and
   if the angle of receipt diverges significantly from the estimated angle to target, concluding that cross-eye jamming is occurring.

19. The vehicle of claim 17, wherein identifying the sum channel maximum includes scanning the received signal.

20. The vehicle of claim 19, wherein scanning the received signal includes electronically scanning the received signal.

21. The vehicle of claim 19, wherein scanning the received signal includes physically scanning the received signal.

22. The vehicle of claim 17, further comprising receiving the reflected sum RADAR signal.

23. The vehicle of claim 17, further comprising applying cross-eye jamming countermeasures upon detecting evidence of cross-eye jamming in the reflected signal.

24. The vehicle of claim 23, wherein applying cross-eye jamming countermeasures includes estimating the source of the cross-eye jamming.

25. The vehicle of claim 17, wherein the antenna is gimbaled.

26. The vehicle of claim 17, wherein the antenna is strapped down.

27. The vehicle of claim 17, wherein the antenna is a monopulse antenna.

28. The vehicle of claim 17, wherein the antenna is a four-quadrant antenna.

29. An apparatus comprising a cross-eye jamming detector.

30. The cross-eye jamming detector of claim 29, wherein the cross-eye jamming detector is implemented in software when the software is executed by a computing device.

31. The cross-eye jamming detector of claim 30, comprising:
   a computing device;
   a bus system;
   a storage communicating with the computing device over the bus;
   a software application residing on the storage and, when executed by the computing device, capable of determining whether a received reflected sum RADAR signal evidences the effects of cross-eye jamming.

32. The cross-eye jamming detector of claim 29, wherein the cross-eye jamming detector is implemented in hardware.

33. The cross-eye jamming detector of claim 32, wherein the cross-eye jamming detector splits each quadrant's signal into a number of predefined angle taps where a series of fixed gain and phase values would be applied to simultaneously steer the receive beam to the desired angles, the number of splits determining the number of fixed preset scan angles used to cover the angles of interest, and wherein the results of the angle tap maxima are compared to the results of the monopulse angle using appropriate scale factors and if cross-eye was indicated the likelihood estimate would be used instead of the monopulse estimate.

34. The cross-eye jamming detector of claim 29, wherein the cross-eye jamming detector is implemented in both hardware and software when the software is executed by a computing device.

35. The cross-eye jamming detector of claim 34, wherein the reflected pulse burst is stored and a set of steering weights is applied to electronically steer the sum channel beam within the angle of interests and thereby build the likelihood surface, whereupon a likelihood surface algorithm compares those results to the monopulse computation and, if the divergence exceeds a predefined threshold, the sum likelihood angle estimate replaces the monopulse estimate.

36. The cross-eye jamming detector of claim 35, wherein the threshold is the beamwidth.

37. The cross-eye jamming detector of claim 29, wherein the cross-eye jamming detector is furthermore capable of mitigating the cross-eye jamming.

* * * * *